(12) United States Patent
Kumai et al.

(10) Patent No.: US 7,666,468 B2
(45) Date of Patent: Feb. 23, 2010

(54) METHOD FOR MANUFACTURING OPTICAL ELEMENT

(75) Inventors: Yoshitomo Kumai, Okaya (JP); Daisuke Sawaki, Suwa (JP)

(73) Assignee: Seiko Epson Corporation (JP)

( * ) Notice: Subject to any disclaimer, the term of this patent is extended or adjusted under 35 U.S.C. 154(b) by 268 days.

(21) Appl. No.: 11/348,438

(22) Filed: Feb. 6, 2006

(65) Prior Publication Data

US 2006/0177571 A1 Aug. 10, 2006

(30) Foreign Application Priority Data

Feb. 10, 2005 (JP) .............................. 2005-034369

(51) Int. Cl.
*B05D 5/06* (2006.01)
(52) U.S. Cl. ..................................... 427/162
(58) Field of Classification Search ................. 427/162, 427/163.1, 164
See application file for complete search history.

(56) References Cited

U.S. PATENT DOCUMENTS

| | | | | |
|---|---|---|---|---|
| 5,478,527 A * | 12/1995 | Gustafson et al. | ......... | 422/82.11 |
| 6,122,103 A * | 9/2000 | Perkins et al. | .............. | 359/486 |
| 6,243,199 B1 | 6/2001 | Hansen et al. | | |
| 6,288,840 B1 | 9/2001 | Perkins et al. | | |
| 6,532,111 B2 | 3/2003 | Kurtz et al. | | |
| 6,788,461 B2 * | 9/2004 | Kurtz et al. | .................. | 359/486 |
| 2004/0023488 A1 * | 2/2004 | Goldstein | ................... | 438/660 |
| 2004/0089101 A1 * | 5/2004 | Winter et al. | ................. | 75/362 |
| 2004/0201890 A1 * | 10/2004 | Crosby | ......................... | 359/486 |
| 2005/0243314 A1 * | 11/2005 | Chinnock | .................... | 356/364 |
| 2006/0050273 A1 * | 3/2006 | Chinnock et al. | ........... | 356/364 |

FOREIGN PATENT DOCUMENTS

| | | |
|---|---|---|
| CN | 1363048 | 8/2002 |
| JP | 2002-328234 | 11/2002 |
| JP | 2003-502708 | 1/2003 |
| JP | 2003-508813 | 3/2003 |
| JP | 2004-077831 | 3/2004 |
| JP | 2004-273205 | 9/2004 |
| JP | 2004-309903 | 11/2004 |
| WO | WO 00/79317 A1 | 12/2000 |
| WO | WO 01/18570 A1 | 3/2001 |

OTHER PUBLICATIONS

Deying Xia and S.R.J. Brueck, "A Facile Approach to Directed Assembly of Patterns of Nanoparticles Using Interference Lithography and Spin Coating", Nano Letters American Chem. Soc. USA, vol. 4, No. 7, 2004, pp. 1295-1299.

(Continued)

*Primary Examiner*—Michael Cleveland
*Assistant Examiner*—Michael G Miller
(74) *Attorney, Agent, or Firm*—Harness, Dickey & Pierce, P.L.C.

(57) ABSTRACT

A method for manufacturing an optical element having a metal wire grid containing a plurality of metal wires on a substrate includes forming the metal wire grid with an LSP (Liquid Self-patterning Process).

1 Claim, 2 Drawing Sheets

OTHER PUBLICATIONS

Deying Xia and S.R.J. Brueck, "A Facile Approach to Directed Assembly of Patterns of Nanoparticles Using Interference Lithography and Spin Coating", Nano Letters American Chem. Soc USA, vol. 4, No. 7, 2004, pp. 1295-1299.

D. Xia and S.R.J. Brueck, "Lithographically Directed Deposition of Silica Nanoparticles Using Spin Coating", J. Vac. Sci. Technol. B, vol. 22, No. 6, 2004, pp. 3415-3419.

Communication from European Patent Office re: related application, May 10, 2006.

* cited by examiner

METHOD FOR MANUFACTURING OPTICAL ELEMENT

CROSS-REFERENCES TO RELATED APPLICATIONS

The entire disclosure of Japanese Patent Application No. 2005-034369, filed on Feb. 10, 2005, is expressly incorporated herein by reference.

BACKGROUND

1. Technical Field

The present invention relates to a method for manufacturing an optical element, specifically, a wire grid polarizer for visible spectrum light.

2. Related Art

Conventionally, various optical elements, e.g., wide band wire grid polarizers that effectively transmit certain polarized light and reflect polarized light that runs perpendicular to that light, have been being developed as disclosed in JP-T-2003-502708 and others.

In inorganic polarizers that are currently in practical use, after resist patterning being performed on a substrate, dry etching is performed using RIE (Reactive Ion Etching) or the like to form a metal embossed pattern. However, when forming an embossed pattern on the nano-order, it is necessary to strictly control the etching parameter, so it has been difficult to manufacture a highly-accurate polarizer at a high yield. Therefore, there has been a demand for manufacturing an optical element, such as a polarizer, that is more inexpensive, highly-accurate, and capable of being mass-produced in greater quantities.

SUMMARY

An advantage of some aspects of the invention is to provide an optical element, such as a polarizer, that is more inexpensive, highly-accurate, and capable of being mass-produced in greater quantities.

According to an aspect of the invention, a method for manufacturing an optical element having a metal wire grid containing a plurality of metal wires on a substrate, comprising forming the metal wire grid with an LSP (Liquid Self-patterning Process) is provided.

It is preferable that the metal wire grid is formed using a metal nano-paste as an embedded paste.

It is preferable that a resist pattern having a concave portion to embed the metal nano-paste therein is provided, and upon the metal nano-paste being burned, metal particles are deposited in the concave portion of the resist pattern.

It is preferable that the metal nano-paste is made from two or more kinds of metals, and forms a multi-element metal wire gird.

It is preferable that after the burning of the metal nano-paste, an LSP is conducted one or more times to form a multi-layered wire grid.

It is preferable that the metal nano-paste contains one or more kinds of metals selected from a group consisting of Al, Ag and Au.

It is preferable that a visible spectrum light polarizer is manufactured as the optical element.

DESCRIPTION OF EXEMPLARY EMBODIMENTS

Hereinafter, preferred embodiments of the method for manufacturing an optical element according to the invention are explained. However, the invention is not limited in any way to those embodiments.

FIGS. 1A to 1E show an example of the steps for manufacturing a visible spectrum polarizer according to the invention.

Embodiment 1

(1) Resist Pattern Formation

Figure 1A:
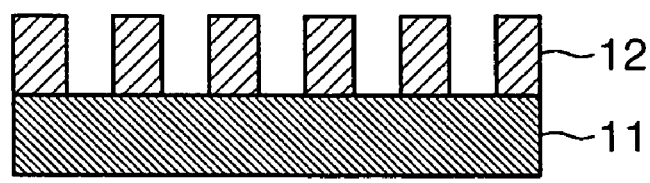
FIGS. 1A to 1E are process diagrams illustrating an embodiment of a method for manufacturing a visible spectrum light polarizer.

As shown in FIG. 1A, a resist pattern 12 is formed on a substrate of quartz or the like using an ordinary method.

(2) Metal Nano-Paste Embedding

Figure 1B:
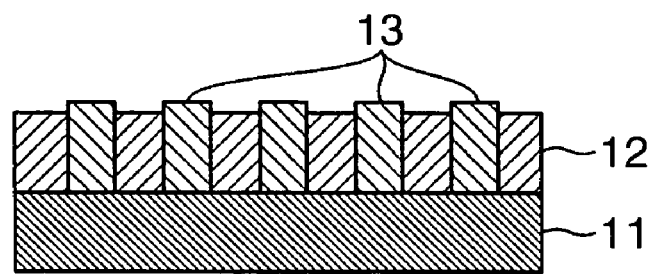

Next, as shown in FIG. 1B, a metal nano-paste 13 made from aluminum (Al) was applied using a spin coating LSP (Liquid Self-patterning process) so that the metal nano-paste 13 is embedded in each concave portion between the resists 12. The rotation speed during the spin coating was 4000 rpm (for 2 seconds), and then was lowered to 2000 rpm (for 20 seconds). It is preferable that for the initial 2 seconds, the spin coating rotation speed is within the range of 500 to 10000 rpm; specifically, 1000 to 7000 rpm, and more specifically 2000 to 5000 rpm is preferable. In this embodiment, the viscosity of the metal nano-paste 13 was 8.3 cps.

(3) Burning Process

Figure 1C:
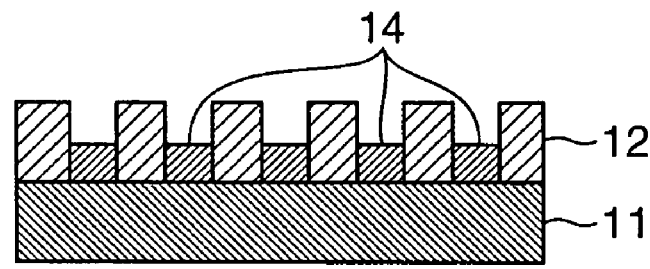

As shown in FIG. 1C, the metal nano-paste 13 was then burned at a low temperature (200° C. or less) in a heating furnace to form the base for a wire grid 14. Upon the metal nano-paste 13 being burned, metal particles of 100 nm or less in size were deposited in the concave portions between the resists 12. Each of the metal particles forming the metal-nano-paste 13 only needs to have a diameter that is smaller than the width of the metal grid wire that the particles are to form, and preferably, that diameter is 100 nm or less.

(4) Wire Grid Formation

Figure 1D:
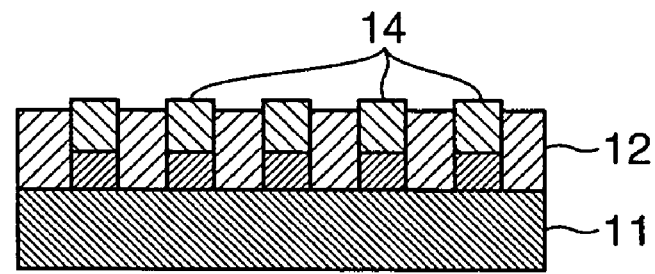

As shown in FIG. 1D, the above processes (1) through (3) were repeated until the metal wire grid 14 reaches a desired height.

(5) Resist Removal

Figure 1E:
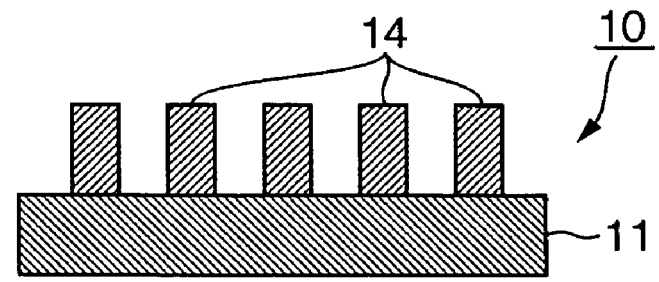

As shown in FIG. 1E, when the metal wire grid 14 reached the desired height, the resists 12 were removed. In this way, a polarizer 10 that is a highly-accurate optical element, having a metal wire grid 14, that is capable of being mass-produced in greater quantities can be obtained at low cost.

Embodiment 2

Figure 2A:
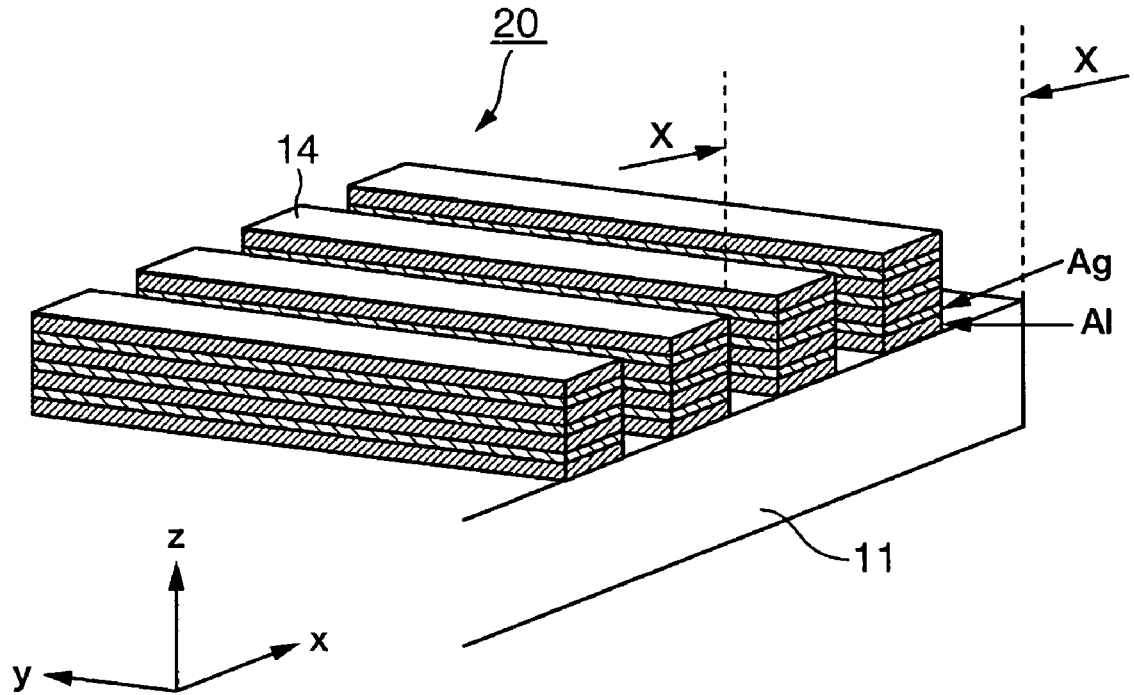
FIG. 2A and FIG. 2B show an example of a visible spectrum light polarizer including a wire grid made from two kinds of metals.
Figure 2B:
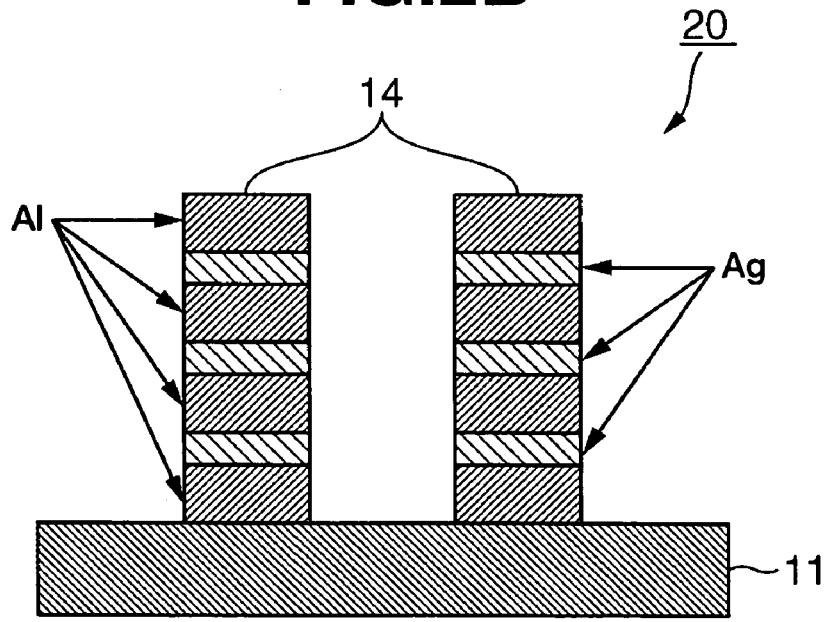

Next, an embodiment in which a paste made from two kinds of metals, Al and silver (Ag), was used as a metal nano-paste will be explained below. FIGS. 2A and 2B show an example of a visible spectrum light polarizer having a wire grid made from two kinds of metals (a laminated alloy), formed by the manufacturing method according to this embodiment. FIG. 2A is a perspective view of a polarizer according to Embodiment 2, and FIG. 2B is a cross-sectional view of the polarizer shown in FIG. 2A taken along the X-X direction.

The method of manufacturing a polarizer according to this embodiment has the same steps as those in Embodiment 1 except the use of a paste made from two kinds of metals, Al and Ag, as a metal nano-paste to be embedded in the concave portions between the resists. Accordingly, for the points not specifically described in Embodiment 2, the matter explained in Embodiment 1 will arbitrarily be adopted.

In this embodiment, a metal nano-paste 13 made from Al, and a metal nano-paste 13 made from Ag were alternately applied by spin coating so that the metal nano-paste 13 is embedded in the concave portions between the resists 12. After the removal of the resists 12, a polarizer 20, which is a highly-accurate optical element, having a metal wire grid 14 containing a plurality of metal wires 14 with Al and Ag alternately laminated, that is capable of being mass-produced in greater quantities (multi-element and multi-layered metal wire grid) can easily be obtained at low cost.

Also in this embodiment, upon the nano-paste 13 being burned, metal particles of 100 nm or less in size were deposited in the concave portions between the resists 12.

Modification

The invention provides the aforementioned preferred embodiments. However, the invention is not limited to those embodiments, and can be modified so long as the modification does not depart from the technical scope of the invention.

In the embodiments, for the LSP, a metal nano-paste was used as an embedded paste. Otherwise, a solution containing nano-carbon, such as carbon nanotube, can be used.

For the metal to form the metal wire grid, other than Al and Ag, it is also preferable to use gold (Au), and a mixture thereof can also be used. A solid solution or intermetalic compound of Al and Ag may also be used.

In the embodiments, a visible spectrum light polarizer is manufactured as an optical element. However, the invention can also be applied to obtain a diffraction grating.

According to the invention, an optical element, such as a polarizer, that is highly-accurate and capable of being mass-produced in greater quantities can be obtained at low cost by forming a metal wire grid in the optical element using an LSP.

Also, a multi-element and multi-layered metal wire grid can be formed easily, which widens the scope for material selection.

The invention is industrially applicable as a method for manufacturing an optical element, such as a polarizer, that is capable of being mass-produced in greater quantities at low cost.

What is claimed is:

1. A method for manufacturing a visible spectrum light polarizing optical element having a laminated multi-metal wire grid containing a plurality of metal wires on a substrate, the method comprising the steps of:

forming a resist on the substrate;

forming concave portions in the resist to provide a resist pattern on the substrate;

embedding Al and Ag nano-pastes in the concave portions of the resist pattern by:

(i) applying the Al nano-paste in the concave portions of the resist pattern by spin coating the Al nano-paste;

(ii) after step (i), heating the applied Al nano-paste at a temperature of 200° C. or less to deposit nano-scale Al particles contained in the Al nano-paste in the concave portions of the resist pattern;

(iii) after step (ii), applying the Ag nano-paste in the concave portions of the resist pattern by spin coating the Ag nano-paste;

(iv) after step (iii), heating the applied Ag nano-paste at a temperature of 200° C. or less to deposit nano-scale Ag particles contained in the Ag nano-paste in the concave portions of the resist pattern; and repeating steps (i) to (iv) until a desired height for the visible spectrum light polarizing optical element is reached; and removing the resist pattern to form the laminated multi-metal wire grid, wherein each of the nano-scale Al and Ag particles has a diameter of 100 nm or less, the spin coating of the AL and AG nano-pastes is performed by initial coating and subsequent coating, and the initial coating is performed at a rotation speed of 2000-5000 rpm.

* * * * *